(12) United States Patent
Kuo et al.

(10) Patent No.: US 11,119,280 B2
(45) Date of Patent: Sep. 14, 2021

(54) GRATING COUPLERS AND METHODS OF MAKING SAME

(71) Applicant: Taiwan Semiconductor Manufacturing Co., Ltd., Hsin-Chu (TW)

(72) Inventors: Feng-Wei Kuo, Zhudong Township, Hsinchu County (TW); Lan-Chou Cho, Hsinchu (TW); Huan-Neng Chen, Taichung (TW); Chewn-Pu Jou, Hsinchu (TW); Wen-Shiang Liao, Toufen Township (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 16/654,623

(22) Filed: Oct. 16, 2019

(65) Prior Publication Data

US 2020/0158960 A1 May 21, 2020

Related U.S. Application Data

(60) Provisional application No. 62/750,992, filed on Oct. 26, 2018.

(51) Int. Cl.
*G02B 6/34* (2006.01)
*G02B 6/124* (2006.01)
(Continued)

(52) U.S. Cl.
CPC .......... *G02B 6/34* (2013.01); *G02B 6/02057* (2013.01); *G02B 6/124* (2013.01); *G02B 6/1225* (2013.01);
(Continued)

(58) Field of Classification Search
CPC .... G02B 6/34; G02B 6/02057; G02B 6/1225; G02B 6/124; G02B 6/00; G02B 6/0013; G02B 6/0015; G02B 6/0016; G02B 6/0023; G02B 6/0026; G02B 6/0031; G02B 6/0033; G02B 6/0035; G02B 6/0036; G02B 6/0038; G02B 6/005; G02B 6/0065;
(Continued)

(56) References Cited

U.S. PATENT DOCUMENTS

2017/0010466 A1* 1/2017 Klug ................. G02B 27/4272

OTHER PUBLICATIONS

Passoni, M. et al., "Simultaneous optimization of coupling efficiency and bandwidth of waveguide grating couplers", 18th European Conference on Integrated Optics, May 18-20, 2016, Warsaw, Poland, 4 pages.

* cited by examiner

*Primary Examiner* — Michael P Mooney
(74) *Attorney, Agent, or Firm* — Duane Morris LLP

(57) ABSTRACT

Disclosed are grating couplers having a high coupling efficiency for optical communications. In one embodiment, an apparatus for optical coupling is disclosed. The apparatus includes: a substrate; a grating coupler comprising a plurality of coupling gratings over the substrate, wherein each of the plurality of coupling gratings extends in a first lateral direction and has a cross-section having a middle-raised shape in a second lateral direction, wherein the first and second lateral directions are parallel to a surface of the substrate and perpendicular to each other in a grating plane; and a cladding layer comprising an optical medium, wherein the cladding layer is filled in over the grating coupler.

20 Claims, 14 Drawing Sheets

(51) Int. Cl.
  *G02B 6/02*   (2006.01)
  *G02B 6/122*  (2006.01)
  *G02B 6/42*   (2006.01)
  *G02B 6/12*   (2006.01)

(52) U.S. Cl.
  CPC ......... *G02B 6/4214* (2013.01); *G02B 6/4249* (2013.01); *G02B 2006/12147* (2013.01)

(58) Field of Classification Search
  CPC ............................ G02B 6/0076; G02B 6/1226; G02B 6/02085; G02B 6/12007; G02B 6/02138; G02B 6/022; G02B 6/29316; G02B 2006/12147; G02B 27/4272; G02B 6/4214; G02B 6/4249; G02B 6/4269
  USPC ............................ 385/37, 129–132, 146, 901
  See application file for complete search history.

600-1

600-2

GRATING COUPLERS AND METHODS OF MAKING SAME

RELATED APPLICATION

This application claims the benefit of and priority to U.S. Patent Provisional Application No. 62/750,992, filed on Oct. 26, 2018, the entirety of which is incorporated herein.

BACKGROUND

Optical gratings are frequently used to enable communication between light sources and other components (e.g., photodetectors). For example, optical gratings can be used to redirect light from an optical fiber into an optical detector. Light coupled from one end of the optical gratings that has been traveling transversely through the optical gratings by reflecting off the inner surfaces at shallow angles may be redirected so that it strikes the inner surfaces at a sharper angle that is greater than the critical angle of incidence, thus allowing the redirected light to escape from the other end of the optical gratings. After escaping, the light may impinge upon a detector. The detected light may then be used for various purposes, such as to receive an encoded communications signal that was transmitted through the optical gratings. Unfortunately, this process, as well as a reverse process in which optical gratings are used to redirect light from an on-chip light source to an optical fiber, may exhibit poor coupling efficiency, with a large part of the redirected light not reaching the detector. There exists a need to develop a method and apparatus of efficient optical coupling using optical gratings.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of illustration.

DETAILED DESCRIPTION OF EXEMPLARY EMBODIMENTS

Figure 1:
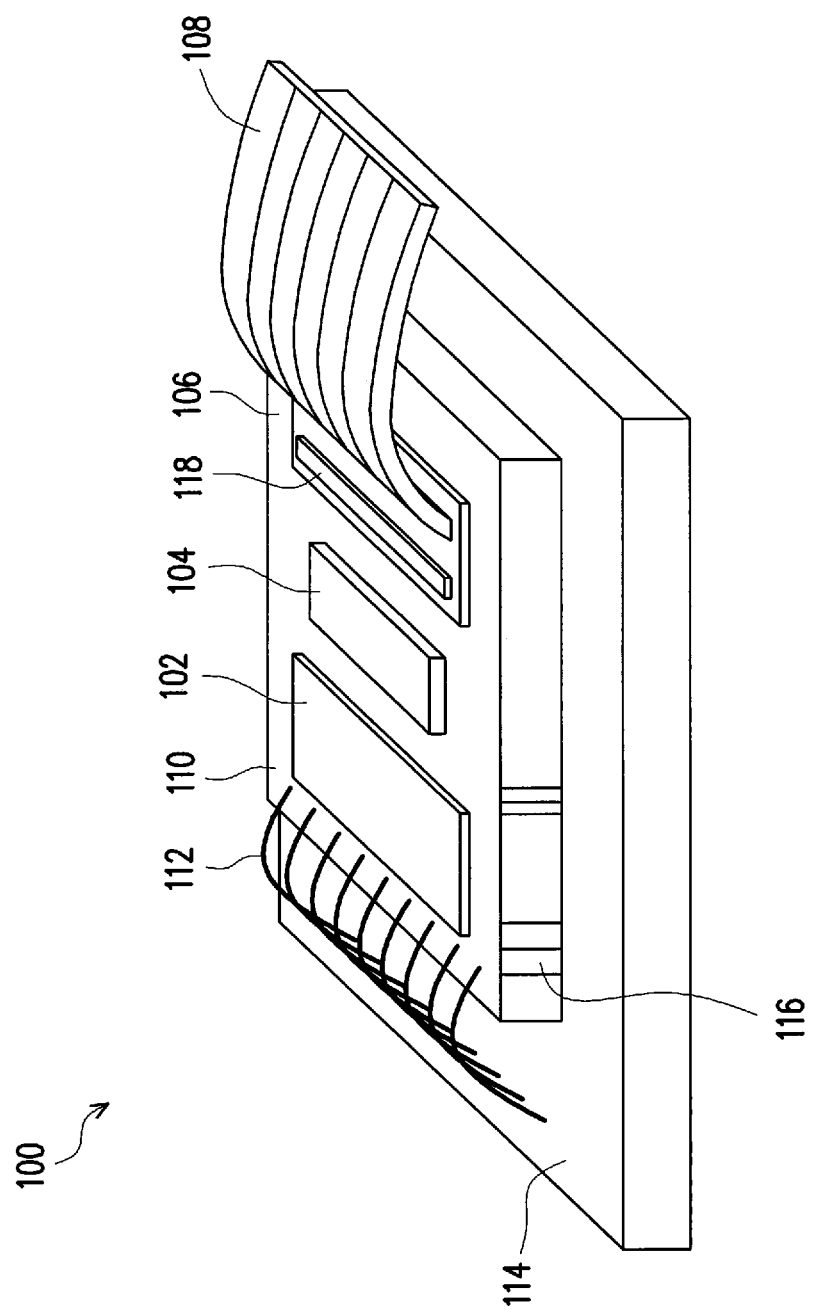
FIG. 1 illustrates an exemplary block diagram of a device, in accordance with some embodiments of present disclosure.

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

The coupling efficiency is the ratio of power that couples from the waveguide mode to the fiber mode (or vice versa) and can be calculated using $CE=(1-R)*\eta_d*\eta_{ov}$, wherein $\eta_d$ is the directionality, $\eta_{ov}$ is the optical field overlap, and R is the back reflection. Directionality $\eta_d$ measures a fraction of power that are diffracted upward. The optical field overlap $\eta_{ov}$ measures the overlap integral between the diffracted field profile and the Gaussian fiber mode, and the back reflection R measures a fraction of power reflected back into the input port. Therefore, in order to improve the coupling efficiency, one can improve the directionality, increase the overlap and use small refractive index contrast to reduce the back reflection. This disclosure presents various embodiments of an efficient fiber-to-chip grating coupler with high coupling efficiency.

In one embodiment, a disclosed grating coupler has a plurality of coupling gratings each having a cross section of a middle-raised shape. A middle-raised shape is a shape having a middle portion that is raised or higher than other portions of the shape, which enables each grating to have a smoother curve. This reduces fiber light loss at the optical input/output (I/O) device and improves the coupling efficiency of the grating coupler.

In addition, while each grating has a raised portion in the middle, the raised portion may have a different width for different gratings. A duty cycle of a grating means a ratio between a width of the raised portion and a width of the grating. That is, different gratings can have different duty cycles. This also helps to improve the coupling efficiency of the grating coupler, because different duty cycles cause apodization to the optical coupling, wherein effective index decreases.

Further, the height and angle of the fiber array may be adjusted to obtain a better grating coupling efficiency. Once an optimal or a desired input angle of the optical signals is determined, one can also design the structure of the grating coupler to ensure a good coupling efficiency. For example, metal layers above the gratings may be etched to form an optical channel that aligns with the optimal or desired input angle. This ensures that the optical signals received via the optical channel will have the optimal or desired input angle for the grating coupler to enjoy a good coupling efficiency.

The disclosed grating coupler has a high coupler efficiency and is easy to implement in any suited silicon photonics I/O and high speed applications. The disclosed grating coupler is convenient for wafer-scale testing as well as low-cost packaging.

FIG. 1 illustrates an exemplary block diagram of a device 100, in accordance with some embodiments of present disclosure. It is noted that the device 100 is merely an example, and is not intended to limit the present disclosure. Accordingly, it is understood that additional functional blocks may be provided in or coupled to the device 100 of FIG. 1, and that some other functional blocks may only be briefly described herein.

Referring to FIG. 1, the device 100 comprises an electronic die 102, a light source die 104, a photonic die 106, an interposer 110 and a printed circuit board (PCB) substrate 114. The electronic die 102, light source die 104 and the photonic die 106 are coupled together through input/output interfaces (not shown) on the interposer 110. In some embodiments, the interposer 110 is fabricated using silicon. In some embodiments, the interposer 110 comprises at least one of the following: interconnecting routing, through silicon via (TSV), and contact pads. In some embodiments, the interposer 110 is to integrate all components including the electronic die 102, the light source die 104, and the photonic die 106 together. In certain embodiments, each of the dies 102/104/106 are coupled to the interposer 110 using a flip-chip (C4) interconnection method. In some embodiments, high density solder microbumps are used to couple the dies 102/104/106 to the interposer 110. Further, the interposer 110 is coupled to the PCB substrate 114 through wire bonding 112 or through silicon-vias (TSV) 116 using soldering balls. The TSVs 116 can comprise electrically conductive paths that extend vertically through the interposer 110 and provide electrical connectivity between the electronic die 102 and the PCB 114. In some embodiments, the PCB substrate 114 can comprises a support structure for the device 100, and can comprise both insulating and conductive material for isolation devices as well as providing electrical contact for active devices on the photonic die 106 as well as circuits/devices on the electronic die 102 via the interposer 110. Further, the PCB substrate 114 can provide a thermally conductive path to carry away heat generated by devices and circuits in the electronic die 102 and the light source die 104.

In some embodiments, the electronic die 102 comprises circuits (not shown) including amplifiers, control circuit, digital processing circuit, etc. The electronic die 102 further comprises at least one electronic circuit (not shown) that provides the required electronic function of the device 100 and driver circuits for controlling the light source 104 or elements in the photonic die 106.

In some embodiments, the light source die 104 comprises a plurality of components (not shown), such as at least one light emitting elements (e.g., a laser or a light-emitting diode), transmission elements, modulation elements, signal processing elements, switching circuits, amplifier, input/output coupler, and light sensing/detection circuits. In some embodiments, each of the at least one light-emitting elements in the light source die 104 can comprise solid-state inorganic, organic or a combination of inorganic/organic hybrid semiconducting materials to generate light. In some embodiments, the light source die 104 is on the photonic die 106.

In some embodiments, the photonic die 106 comprises an optical fiber array 108, an optical interface and a plurality of fiber-to-chip grating couplers 118. In some embodiments, the plurality of fiber-to-chip grating coupler 118 is configured to couple the light source 106 and the optical fiber array 108. In some embodiments, the optical fiber array 108 comprises a plurality of optical fibers and each of them can be a single-mode or a multi-mode optical fiber. In some embodiments, the optical fiber array 108 can be epoxied on the photonic die 106.

In some embodiments, the photonic die 106 further comprises components (not shown) such as a laser driver, digital control circuit, photodetectors, waveguides, small form-factor pluggable (SFP) transceiver, High-speed phase modulator (HSPM), calibration circuit, distributed Mach-Zehnder Interferometer (MZI), grating couplers, light sources, (i.e., laser), etc. Each of the plurality of fiber-to-chip grading coupler 118 enables the coupling of optical signals between the optical fiber array 108 and the light source die 102 or corresponding photodetectors on the photonic die 106. Each of the plurality of fiber-to-chip grating couplers 118 comprises a plurality of gratings and a waveguide with designs to reduce refractive index contrast to reduce back reflection losses providing improved coupling efficiency between the optical fiber on the corresponding waveguide, which are discussed in details below in various embodiments of the present disclosure.

During operation, optical signals received from a remote server attached on one end of the optical fiber array 108 can be coupled through the fiber-to-chip grating couplers 118 attached to the other end of the optical fiber array 108 to the corresponding photodetectors on the photonic die 106. Alternatively, optical signals received from the light source die 104 can be coupled through the fiber-to-chip grating couplers 118 to the optical fiber array 108 which can be further transmitted to the remote server.

Figure 2A:
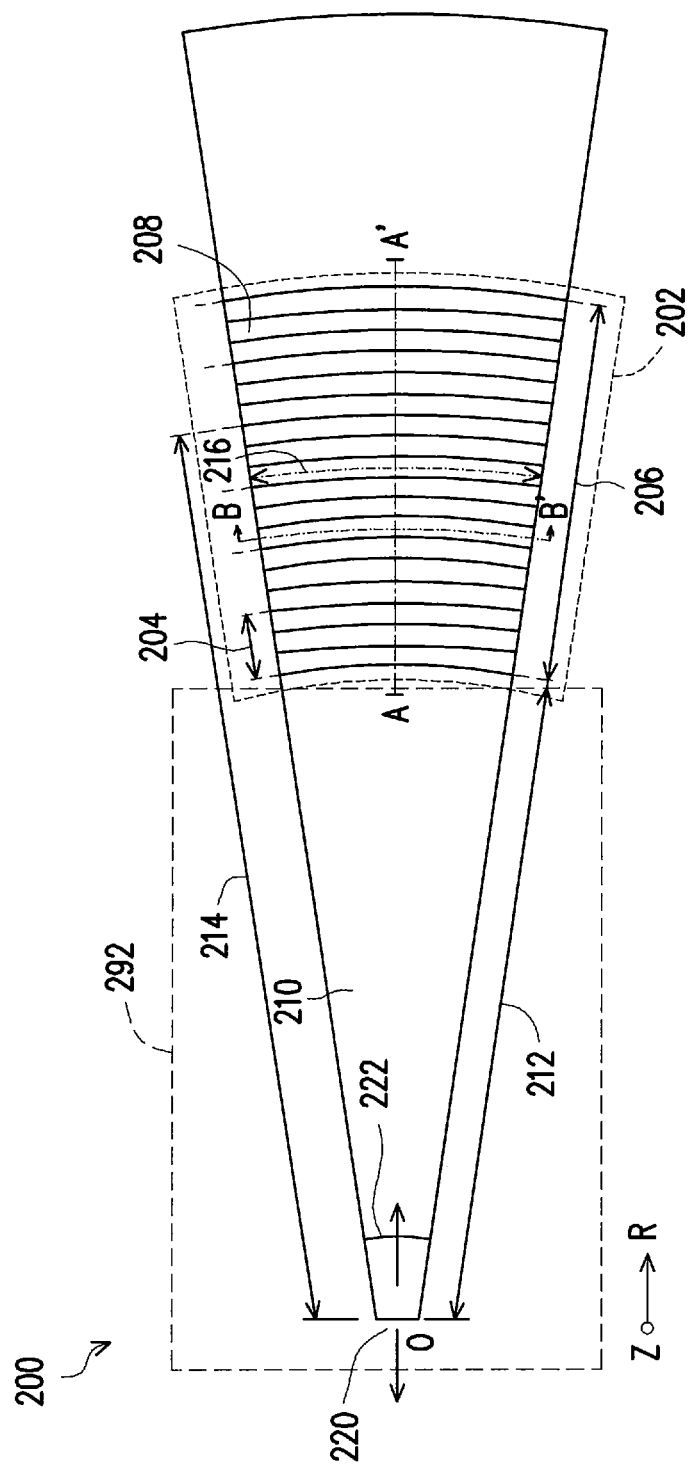
FIG. 2A illustrates a top view of an exemplary grating coupler, in accordance with some embodiments of the present disclosure.

FIG. 2A illustrates a top view of an exemplary fiber-to-chip grating coupler 200, in accordance with some embodiments of the present disclosure. In some embodiments, the fiber-to-chip grating coupler (hereinafter "grating coupler") 200 comprises a grating region 202 and a waveguide 210. The grating region 202 comprises a plurality of periodic gratings 204. In the illustrated embodiments, curved lines are edges 208 of a plurality of gratings 204 in the grating coupler 200. Any numbers of edges 208 in each grating 204 and any numbers of gratings 204 in a grating coupler 200 can be used and are within the scope of the present disclosure.

In the illustrated embodiment, the grating coupler 200 scatters incident optical field 220 received from a waveguide 210 in a direction perpendicular to the gratings 204 along the radius direction, the refractive index contrast between that of the waveguide 210 and the grating region 202 causes strong scattering out of the gratings 204. The plurality of periodic gratings 204 in the grating region 202 produces an exponentially decaying intensity profile along the propagation direction along the radius direction at a given angle 222 relative to one end of the grating coupler 200. The exponentially decaying intensity profile may determine a position of an optical fiber (not shown) in the optical fiber array 108 on top of the grating coupler 200 so as to efficiently couple the optical field from the chip to the optical fiber. In some embodiments, the number of periodic gratings 204 can be determined according to the shape, geometry and materials of the gratings, as well as a desired operational wavelength range.

Referring to FIG. 2A, the grating region 202 and the waveguide 210 comprise a length 206 and 212 in the radius direction, respectively. In some embodiments, each of the plurality of gratings 204 comprises a radius of curvature 214 according to its position to the center "O" and an arc length 216. In some embodiments, each of the plurality of gratings 204 in the grating coupler 200 does not have a curvature, i.e., gratings are straight and have a same length 216.

Figure 2B:
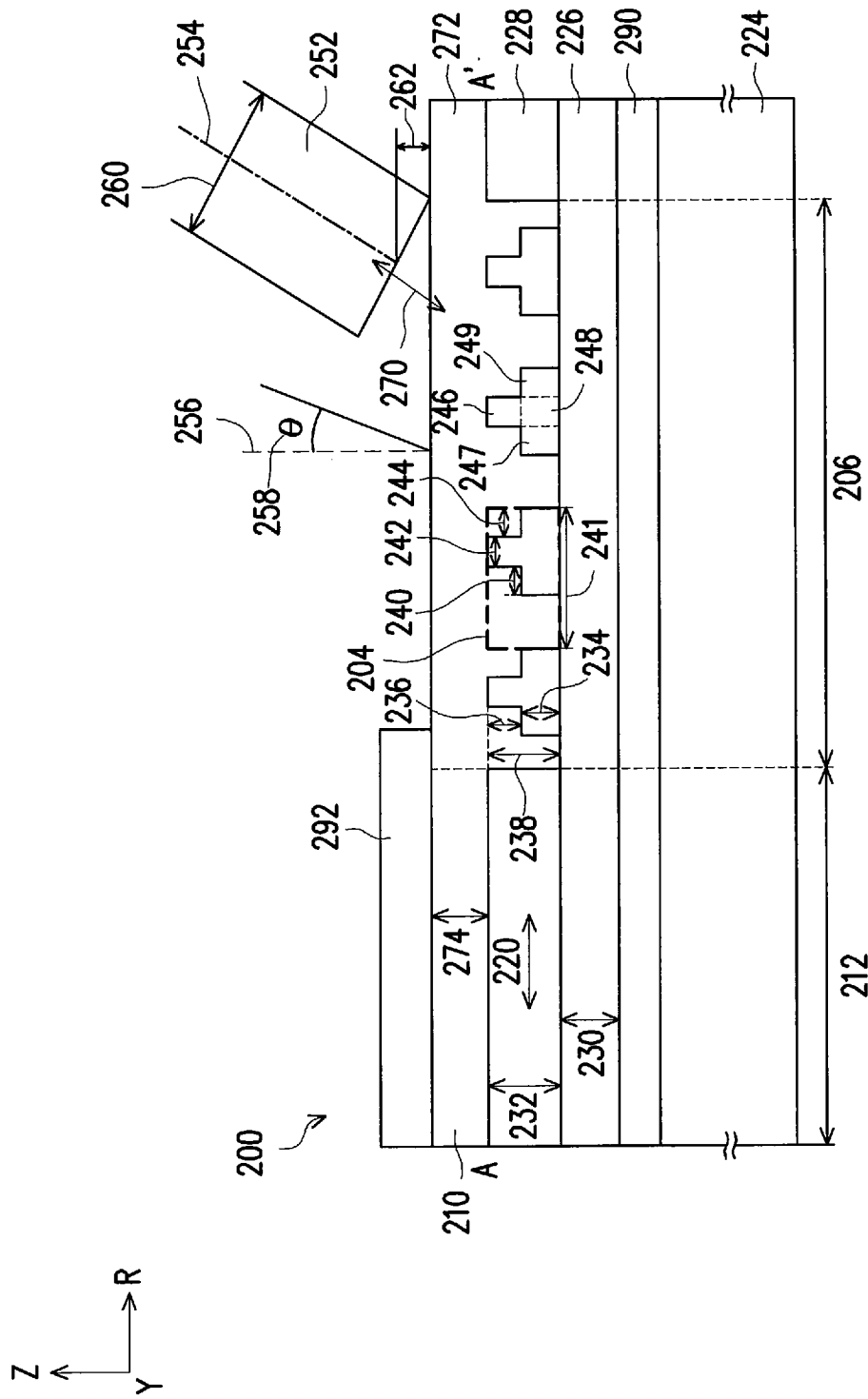
FIG. 2B illustrates a cross-sectional view of an exemplary grating coupler along the radius direction (A-A') in FIG. 2A, in accordance with some embodiments of the present disclosure.

FIG. 2B illustrates a cross-sectional view of an exemplary grating coupler 200 along the radius direction (A-A') in FIG. 2A, in accordance with some embodiments of the present disclosure. In the illustrated embodiments, the grating coupler 200 fabricated on a silicon substrate 224 comprises a multi-layered structure comprising a bottom reflection layer 290, a silicon oxide layer 226, a silicon layer 228, and a top reflection layer 292.

In the illustrated embodiment, the silicon oxide layer 226 is fabricated on the silicon substrate 224 using chemical vapor deposition, physical vapor deposition, etc. In some embodiments, the silicon oxide layer 226 has a thickness of 500-3000 nanometers. In some embodiments, this layer can be replaced by other types of dielectric materials, such as Si, Si3N4, SiO2 (e.g., quartz, and glass), Al2O3, and H2O, according to various embodiments of the present disclosure.

In some embodiments, the silicon layer 228 is deposited on the silicon oxide layer 226 using chemical vapor deposition. In some embodiments, the silicon layer 228 has a thickness of 270 nanometers. In some other embodiments, the silicon layer 228 has a thickness in a range of 250-350 nanometers according to various embodiments of the present disclosure.

In some embodiments, the bottom reflection layer 290 comprises at least one of the following: Al, Cu, Ni, and a combination. In some embodiments, the bottom reflection layer 290 has a thickness in a range of 0.1-10 micrometers. In some embodiments, the top reflection layer 292 comprises at least one of the following: Al, Cu, Ni and a combination. In some embodiments, the top reflection layer 292 has a thickness in a range of 0.1-10 micrometers. In some embodiments, the top reflection layer 292 only covers the waveguide 210. In some embodiments, the top reflection layer 292 is equal to or greater than 20×20 microns.

In some embodiments, the waveguide 210 comprises the same material used in the plurality of gratings 204. In some other embodiments, the waveguides 210 comprises a second material that is different from the material used in the plurality of gratings 204.

In the illustrated embodiments, each of the plurality of gratings 204 has a sidewall profile having a middle-raised shape for achieving a low back-reflection and a high directionality. In some embodiments, the middle-raised shape has a middle-raised portion 246 that is farther away from the substrate 224 than other portions of the middle-raised shape. As shown in FIG. 2B, in addition to the middle-raised portion 246, the middle-raised shape of each grating 204 also includes a left portion 247, a right portion 249, and a middle base portion 248 that is right below the middle-raised portion 246.

As shown in FIG. 2B, the left portion 247 has a width 240, the middle-raised portion 246 has a width 242, and the right portion 249 has a width 244. In some embodiments, the middle-raised shape is symmetric about the Z direction perpendicular to the grating plane or the top surface of the silicon oxide layer 226. That is, the width 240 may be the same as the width 244, and the middle-raised portion 246 is right in the middle of the middle-raised shape of the grating 204. In other embodiments, the middle-raised portion 246 may not be right in the middle of the middle-raised shape of the grating 204, and the width 240 can be different from the width 244.

As shown in FIG. 2B, the left portion 247 and the right portion 249 have a thickness 234, and the middle-raised portion 246 has a thickness 236. As such, the sidewall of the grating 204 has a total thickness 238 that is equal to a sum of the thickness 234 and the thickness 236. The sidewall is perpendicular to the substrate surface (i.e., top surface of the silicon oxide layer 226). The dimensions of the plurality of periodic gratings 204 will be discussed in further detail below.

In some embodiments, the middle-raised shape is formed by a multi-step etching process. For example, a shallow trench is formed on each side of the middle-raised portion 246 in the silicon layer 228 by an etching step; and a deep or full trench is formed between two adjacent gratings 204 in the silicon layer 228 by an etching step. In the illustrated embodiments, one period 241 of the sidewall profile of the plurality of periodic gratings 204 includes a full trench, a middle-raised shape, and two shallow trenches. In some embodiments, a grating region 202 has a length of 206 (as shown in FIG. 2A) and a waveguide 210 has a length of 212 in the radius direction.

In some embodiments, the grating coupler 200 is further covered with a cladding layer 272. In some embodiments, the cladding layer 272 comprises silicon oxide and has a thickness 274 from its top surface to the top surface of the underneath unpatterned silicon layer 228. In some embodiments, the cladding layer 272 has a thickness of 2 micrometers. In some embodiments, the thickness 274 of the cladding layer 272 can be in a range of 0.6-3 micrometers according to various applications. In some embodiments, the cladding layer 272 can comprise other types of dielectric materials according to different applications, including polycrystalline silicon and silicon nitride. In some other embodiments, the cladding layer 272 comprises a plurality of layers with graded indices (i.e., the refractive index of the layers in the cladding layer 272 increases). In some embodiments, the thickness of the plurality of layers can be individually adjusted according to various applications. It should be noted that this is merely an example and optimized thickness of the cladding layer 272 is a function of its effective index (i.e., material properties) in combination with the grading structure underneath. Therefore, any thickness of the cladding layer 272 can be used to achieve optimized coupling efficiency at desired wavelengths and are within the scope of the present disclosure.

In some embodiments, the radiated optical field 270 from the grating coupler 200 with an electric field normal to the plane of incidence (i.e., transverse-electric TE polarized) is collected by an optical fiber 252 with a core diameter 260. In one example, the fiber core diameter 260 is less than 10 micrometers. In some embodiments, the core of the optical fiber 252 is located at a distance 262 from the center of its core to the top surface of the cladding layer 272. In some embodiments, the optical fiber 252 receives the optical field 270 at an angle 258 (between an axis 254 of the optical fiber 252 and the z-axis 256 perpendicular to the surface of the substrate). In some embodiments, the angle 258 is 12 degree. In some other embodiments, the angle 258 of the optical fiber 252 can be configured in a range of 5-15 degrees according to the structural/geometric/materials properties of the grating coupler 200 and the cladding layer 272. In some embodiments, the optical fiber 252 can be a single mode fiber or a multimode fiber.

Figure 2C:
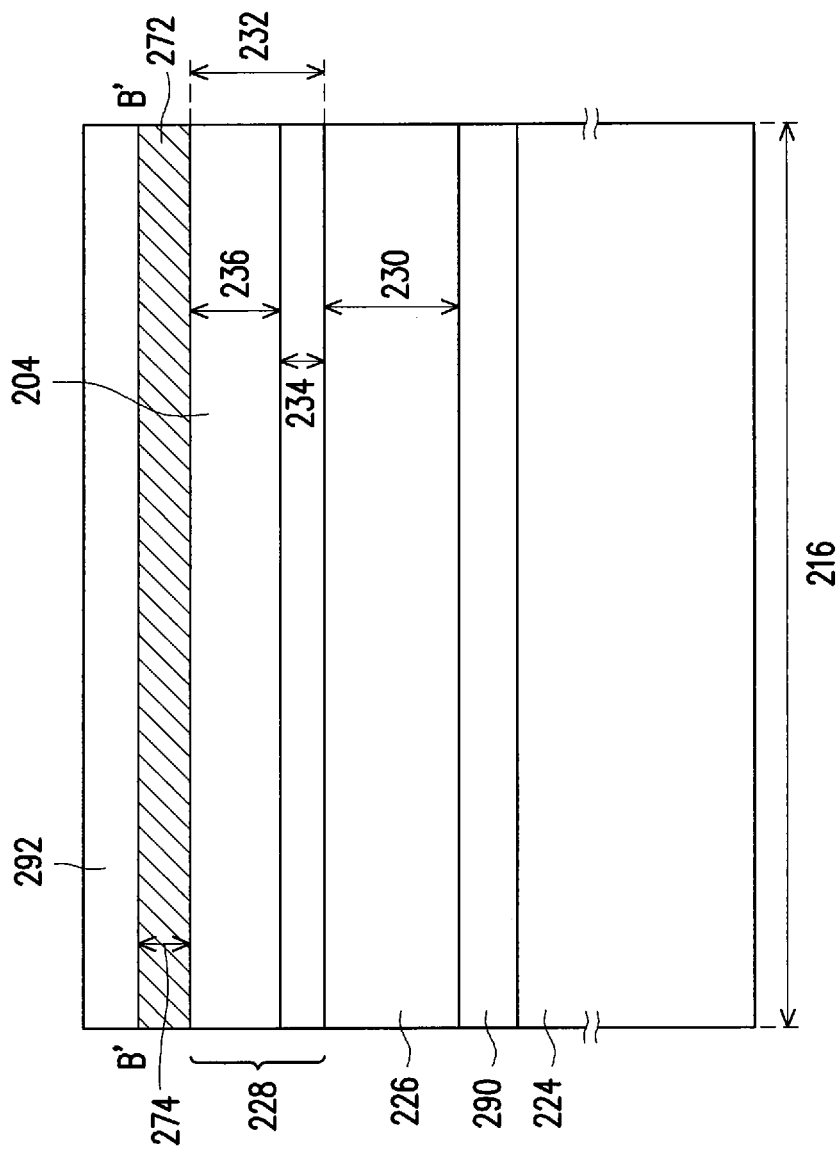
FIG. 2C illustrates a cross-sectional view of an exemplary grating coupler along the B-B' direction as shown in FIG. 2A, in accordance with some embodiments of the present disclosure.

FIG. 2C illustrates a cross-sectional view of an exemplary fiber-to chip grating coupler 200 along the B-B' direction as shown in FIG. 2A, in accordance with some embodiments of the present disclosure. The middle-raised shaped grating 204 in a silicon layer 228 with its cross-sectional view 200 shown in FIG. 2B is continuous throughout a length 216. In the illustrated embodiments, the grating 204 comprises 2 etch steps and each of the two steps have a step height 234 and 236, respectively. In some embodiments, a thickness 232 of the silicon layer 228 equals to the summation of the step heights 234 and 236. In some embodiments, the thickness 232 of the silicon layer 228 is 270 nanometers. In some other embodiments, the thickness 232 of the silicon layer can be in a range of 180-400 nanometers.

Figure 3:
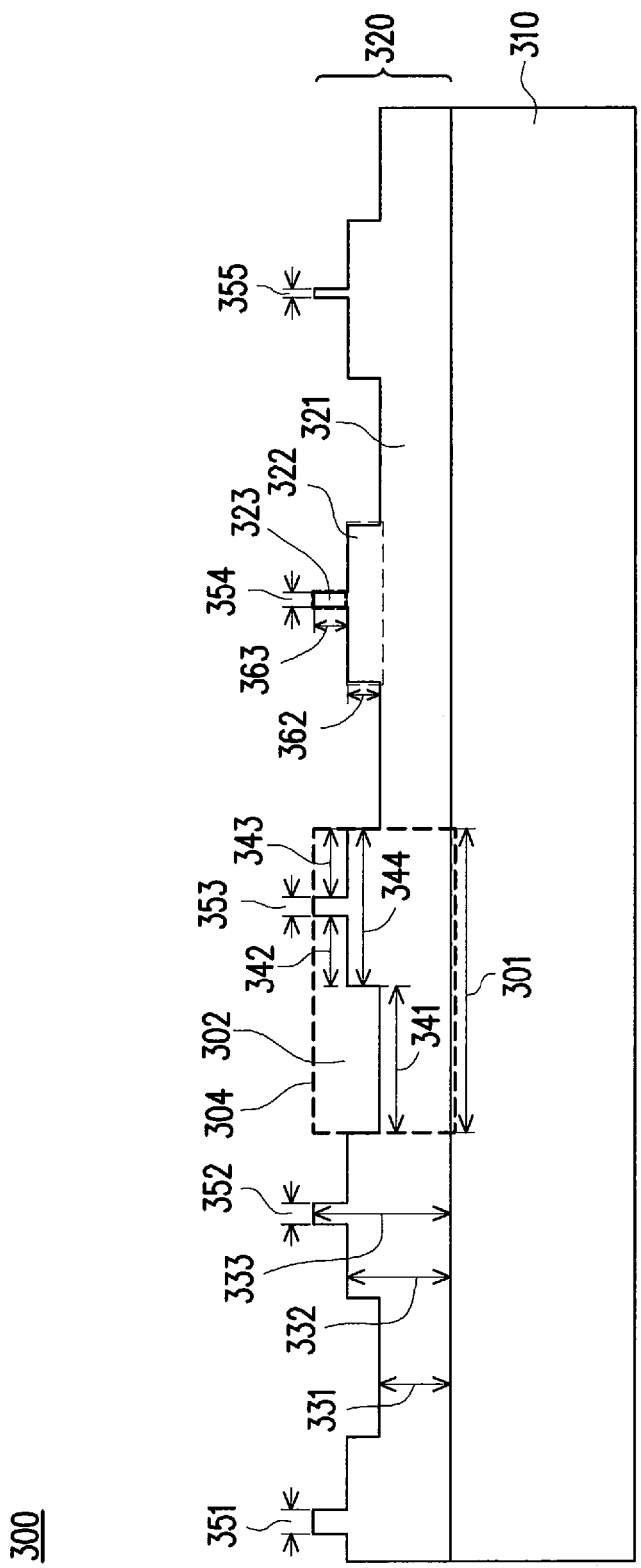
FIG. 3 illustrates a cross-sectional view of an exemplary grating coupler comprising a plurality of coupling gratings, in accordance with some embodiments of the present disclosure.

FIG. 3 illustrates a cross-sectional view of an exemplary grating coupler 300 comprising a plurality of coupling gratings 304, in accordance with some embodiments of the present disclosure. As shown in FIG. 3, the grating coupler 300 has a silicon layer 320 disposed on a silicon oxide layer 310. Each of the plurality of coupling gratings 304 is located in the silicon layer 320. In this embodiment, the silicon layer 320 includes three sublayers: a first sublayer 321, a second sublayer including a plurality of stacks 322 on the first sublayer 321, and a third sublayer including a plurality of stacks 323 each located on a corresponding stack 322.

The stacks 323 may have different widths from each other. As shown in FIG. 3, the widths 351, 352, 353, 354, 355 of the stacks 323 are decreasing from left to right. According to various embodiments, the widths of the stacks 323 may also increase from left to right, first increase and then decrease from left to right, or first decrease and then increase from left to right. In some embodiments, the width 353 is equal to 220 nanometers. In some embodiments, the widths 351, 352, 353, 354, 355 are in a range of 0-500 nanometers, according to applications with different operational wavelengths.

Each of the plurality of stacks 322 in the second sublayer has a width 344, which is equal to a sum of a left portion width 342, a right portion width 343 and the width (351, 352, 353, 354, or 355) of the corresponding stack 323. The corresponding stack 323 is a middle-raised portion on top of the stack 322. In some embodiments, the stack 323 is right in the middle of the stack 322, which means the left portion width 342 is the same as the right portion width 343. In other embodiments, the stack 323 is not right in the middle of the stack 322, which means the left portion width 342 can be different from the right portion width 343. In some embodiments, each of the left portion width 342 and the right portion width 343 is equal to 120 nanometers. In some embodiments, each of the left portion width 342 and the right portion width 343 is larger than 0 nanometer and less than 250 nanometers, according to applications with different operational wavelengths.

As shown in FIG. 3, every two adjacent stacks 322 are separated by a trench 302 having a width 341. According to various embodiments, the width 341 is larger than 0 nanometer and less than 250 nanometers, according to applications with different operational wavelengths. In some embodiments, the width 341 is different for different pairs of adjacent stacks 322.

Each grating 304 has a total width 301 that is a sum of the width 341 and the width 344. According to various embodiments, the total width 301 is larger than 0 nanometer and less than 1250 nanometers, according to applications with different operational wavelengths. For example, for an operational wavelength of 1310 nanometers, the total width 301 is designed to be less than 600 nanometers.

As discussed above, the widths 351, 352, 353, 354, 355 of the stacks 323 are different from each other. This means the stacks 323 have different duty cycles relative to the corresponding stacks 322. A duty cycle of a stack 323 on a corresponding stack 322 is measured as a ratio between a width (351, 352, 353, 354 or 355) of the stack 323 and the width 344 of the corresponding stack 322. As such, the duty cycles of the stacks 323 may change along the lateral direction from left to right. For example, the duty cycles of the stacks 323 decreases along the lateral direction from left to right in FIG. 3. According to various embodiments, the duty cycles of the stacks 323 are in a range of 0-50%.

As discussed above, the widths 341 of the trenches 302 in different gratings 304 may be different from each other. This means the stacks 322 may also have different duty cycles relative to the gratings 304. A duty cycle of a stack 322 in a corresponding grating 304 is measured as a ratio between the width 344 of the stack 322 and the total width 301 of the corresponding grating 304. As such, the duty cycles of the stacks 322 may change along the lateral direction from left to right. For example, the duty cycles of the stacks 322 may decrease, increase, first decrease then increase, or first increase then decrease, along the lateral direction from left to right in FIG. 3. According to various embodiments, the duty cycles of the stacks 322 are in a range of 20%-50%.

As shown in FIG. 3, each stack 323 has a thickness 363, each stack 322 has a thickness 362, and the first sublayer 321 has a thickness 331. As such, each grating 304 has a total thickness 333 that is equal to a sum of the thickness 363, the thickness 362, and the thickness 331. In some embodiments, each grating 304 is formed by a multi-step etching process. For example, a shallow trench is formed on each side of the stack 323; and a deep trench is formed between every two adjacent stacks 322.

As shown in FIG. 3, each grating 304 has a first etching thickness 331, a second etching thickness 332 equal to a sum of the first etching thickness 331 and the thickness 362, and a third etching thickness 333, equal to a sum of the second etching thickness 332 and the thickness 363. According to various embodiments, the first etching thickness 331 is in a range of 0-200 nanometers according to various applications with different operational wavelengths. The first etching thickness 331 in the example shown in FIG. 3 is larger than 0 nanometer. According to various embodiments, the second etching thickness 332 is in a range of 0-270 nanometers according to various applications with different operational wavelengths. The second etching thickness 332 in the example shown in FIG. 3 is larger than 70 nanometers. According to various embodiments, the third etching thickness 333 is in a range of 250-350 nanometers according to various applications with different operational wavelengths. The third etching thickness 333 in the example shown in FIG. 3 is larger than 270 nanometers to ensure that a coupler efficiency of the grating coupler 300 is higher than a threshold.

Although the edge patterns of the stacks 322, 323 are following a right angle of 90 degrees, the vertical and horizontal edge patterns of the stacks 322, 323 may follow an arc pattern with a degree less than 90 with a feasible process of fabrication.

Figure 4:
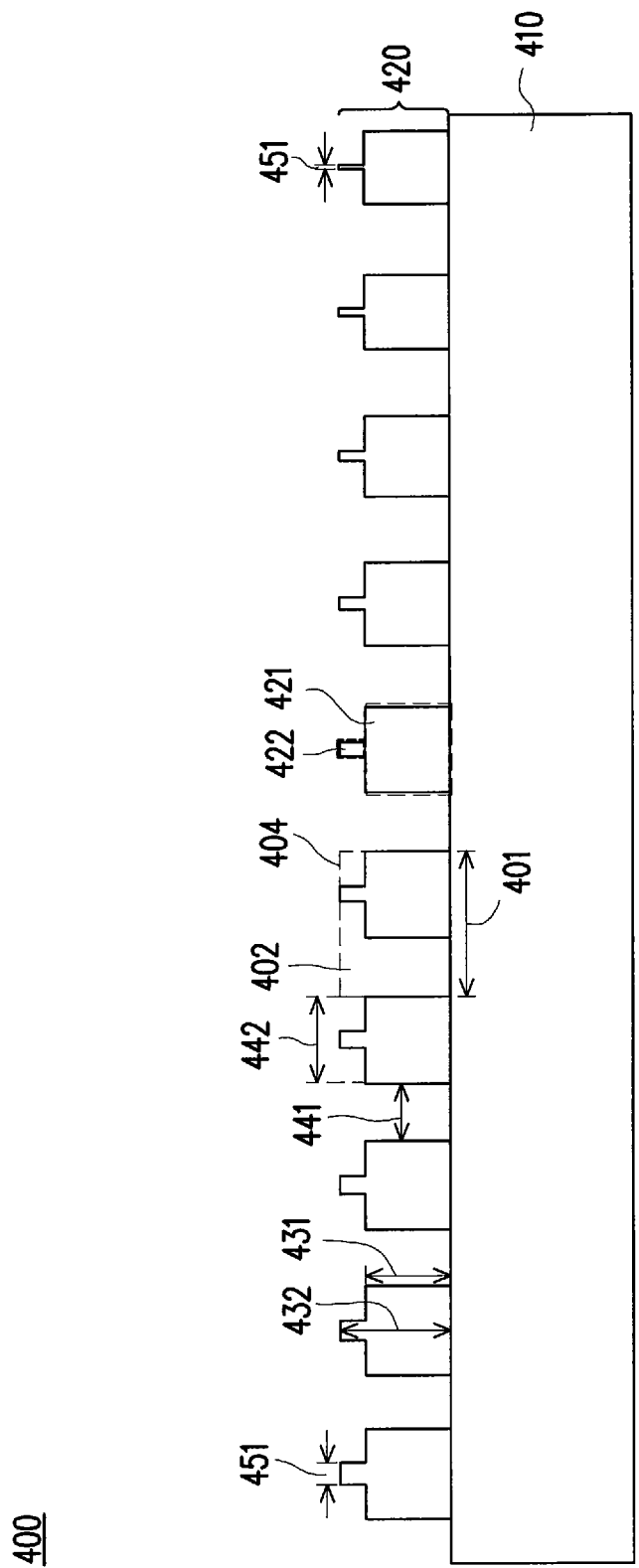
FIG. 4 illustrates a cross-sectional view of another exemplary grating coupler comprising a plurality of coupling gratings, in accordance with some embodiments of the present disclosure.

FIG. 4 illustrates a cross-sectional view of another exemplary grating coupler 400 comprising a plurality of coupling gratings 404, in accordance with some embodiments of the present disclosure. As shown in FIG. 4, the grating coupler 400 has a silicon layer 420 disposed on a silicon oxide layer 410. Similar to the embodiment shown in FIG. 3, each of the plurality of coupling gratings 404 in FIG. 4 is located in the silicon layer 420.

Different from the embodiment shown in FIG. 3, the silicon layer 420 in FIG. 4 includes two sublayers: a first sublayer including a plurality of stacks 421 on the silicon oxide layer 410, and a second sublayer including a plurality of stacks 422 each located on a corresponding stack 421. The widths 451 of the stacks 422 may be different from each other, e.g. decreasing from left to right (as shown in FIG. 4), increasing from left to right, first increasing and then decreasing from left to right, or first decreasing and then increasing from left to right. As such, the stacks 422 have different duty cycles relative to the corresponding stacks 421. A duty cycle of a stack 422 on a corresponding stack 421 is measured as a ratio between a width 451 of the stack 422 and the width 442 of the corresponding stack 421. The duty cycles of the stacks 422 may change (e.g. increase, decrease, or a mix of both) along the lateral direction from left to right in FIG. 4. According to various embodiments, the duty cycles of the stacks 422 are in a range of 0-50%. In some embodiments, the widths 451 are in a range of 0-500 nanometers according to applications with different operational wavelengths. Each of the plurality of stacks 421 in the first sublayer has a width 442. Each stack 422 is a middle-raised portion on top of the corresponding stack 421. In some embodiments, the width 442 is larger than 0 nanometer and less than 1000 nanometers according to applications with different operational wavelengths.

As shown in FIG. 4, every two adjacent stacks 421 are separated by a trench 402 having a width 441. Different from the embodiment shown in FIG. 3, the trench 402 in FIG. 4 is a full trench extending downward onto the silicon oxide layer 410. According to various embodiments, the width 441 is larger than 0 nanometer and less than 250 nanometers according to applications with different operational wavelengths. In some embodiments, the width 441 is different for different pairs of adjacent stacks 421. Each grating 404 has a total width 401 that is a sum of the width 441 and the width 442. As such, the stacks 421 may also have different duty cycles relative to the gratings 404. A duty cycle of a stack 421 in a corresponding grating 404 is measured as a ratio between the width 442 of the stack 421 and the total width 401 of the corresponding grating 404. The duty cycles of the stacks 421 may change (e.g. increase, decrease, or a mix of both) along the lateral direction from left to right in FIG. 4. According to various embodiments, the duty cycles of the stacks 421 are in a range of 20%-50%.

In some embodiments, each grating 404 is formed by a multi-step etching process. For example, a shallow trench is formed on each side of the stack 422; and a full trench is formed between every two adjacent stacks 421. As shown in FIG. 4, each stack 421 in the grating 404 has a thickness 431, and each grating 404 has a total thickness 432. According to some embodiments, the thickness 431 is in a range of 0-270 nanometers according to various applications with different operational wavelengths. According to some embodiments, the total thickness 432 is in a range of 250-350 nanometers according to various applications with different operational wavelengths.

Figure 5:
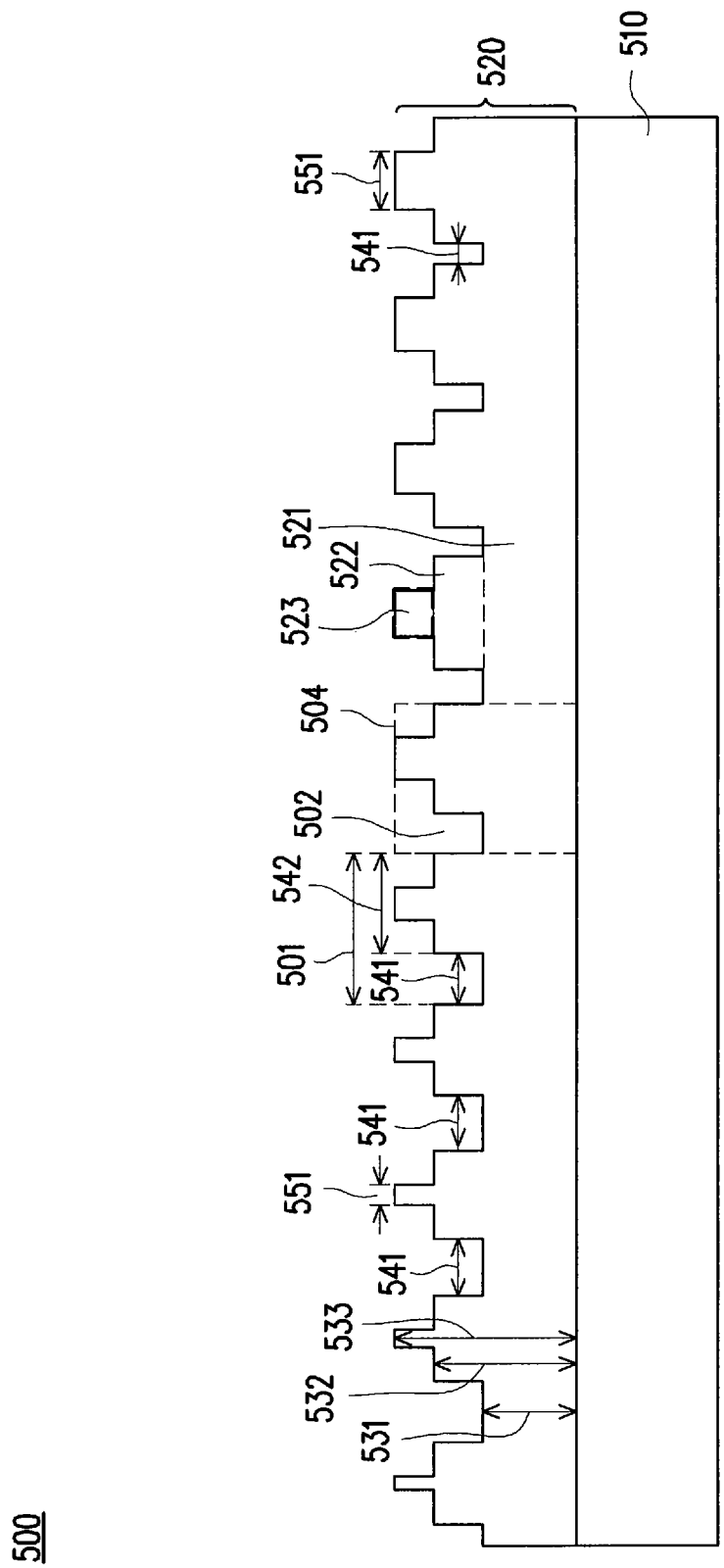
FIG. 5 illustrates a cross-sectional view of yet another exemplary grating coupler comprising a plurality of coupling gratings, in accordance with some embodiments of the present disclosure.

FIG. 5 illustrates a cross-sectional view of yet another exemplary grating coupler 500 comprising a plurality of coupling gratings 504, in accordance with some embodiments of the present disclosure. As shown in FIG. 5, the grating coupler 500 has a silicon layer 520 disposed on a silicon oxide layer 510. Similar to the embodiment shown in FIG. 3, each grating 504 located in the silicon layer 520 includes three sublayers: a first sublayer 521, a second sublayer including a plurality of stacks 522 on the first sublayer 521, and a third sublayer including a plurality of stacks 523 each located on a corresponding stack 522.

Different from the embodiment shown in FIG. 3, the widths 551 of the stacks 523 increase from left to right in FIG. 5. As such, the duty cycles of the stacks 523 also increase along the lateral direction from left to right in FIG. 5, for a given width 542 of the stacks 522. According to some embodiments, the duty cycles of the stacks 523 are in a range of 0-50%. Every two adjacent stacks 522 are separated by a trench 502 having a width 541, which may be different for different pairs of adjacent stacks 522. Each grating 504 has a total width 501 that is a sum of the width 541 and the width 542.

Different from the embodiment shown in FIG. 3, the widths 541 of the trenches 502 decrease along the lateral direction from left to right in FIG. 5. Accordingly, the duty cycles of the stacks 522 increase along the lateral direction from left to right in FIG. 5.

In some embodiments, each grating 504 is formed by a multi-step etching process. For example, a shallow trench is formed on each side of the stack 523; and a deep trench is formed between every two adjacent stacks 522. Each grating 504 has a first etching thickness 531 of the first sublayer 521, a second etching thickness 532 equal to a total thickness of the first and second sublayers 521, 522, and a third etching thickness 333 equal to a total thickness of the gratings 504. According to some embodiments, the first etching thickness 531 is in a range of 0-200 nanometers, the second etching thickness 532 is in a range of 0-270 nanometers, the third etching thickness 533 is in a range of 250-350 nanometers, according to various applications with different operational wavelengths.

Figure 6A:
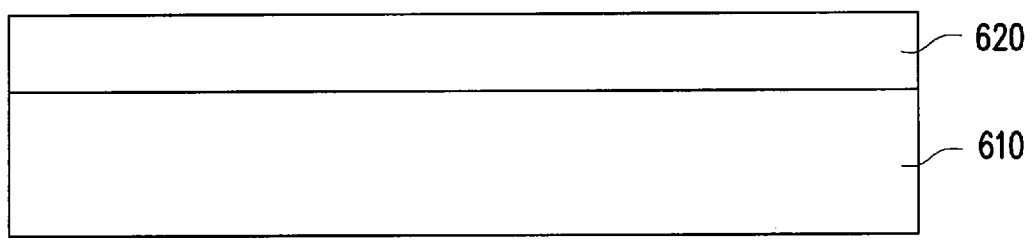
FIGS. 6A-6J illustrate cross-sectional views of an exemplary grating coupler at various stages of a fabrication process, in accordance with some embodiments of the present disclosure.

FIGS. 6A-6J illustrate cross-sectional views of an exemplary grating coupler 600 at various stages of a fabrication process, in accordance with some embodiments of the present disclosure. FIG. 6A is a cross-sectional view of the grating coupler 600 including a first layer 610 and a second layer 620 disposed on the first layer 610, at one of the various stages of fabrication, according to some embodiments of the present disclosure. The first layer 610 may be formed of silicon oxide, as shown in FIG. 6A, or another oxide material. The second layer 620 may be formed of silicon, as shown in FIG. 6A, or another semiconductor material.

Figure 6B:
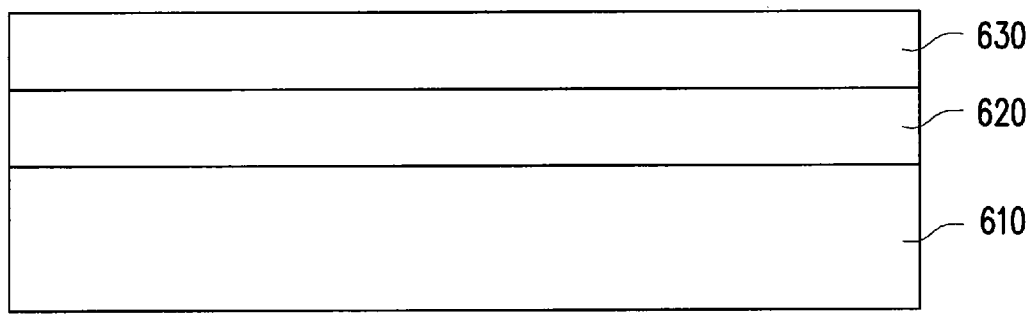

FIG. 6B is a cross-sectional view of the grating coupler 600 including a masking layer 630 formed on the silicon layer 620 at one of the various stages of fabrication, according to some embodiments of the present disclosure. The coated masking layer 630 on the silicon layer 620 may comprise a photoresist (PR) material.

Figure 6C:
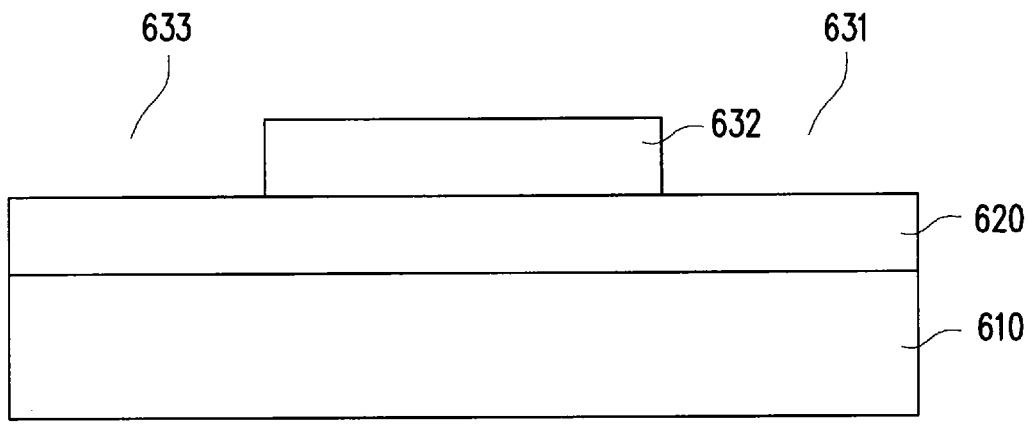

FIG. 6C is a cross-sectional view of the grating coupler 600 including a middle portion 632 of the masking layer 630, which is formed on the silicon layer 620 at one of the various stages of fabrication, according to some embodiments of the present disclosure. The masking layer 630 is patterned to have the middle portion 632 left on the silicon layer 620, e.g. by removing the left portion 633 and the right portion 631 based on waveguide lithography and development.

Figure 6D:
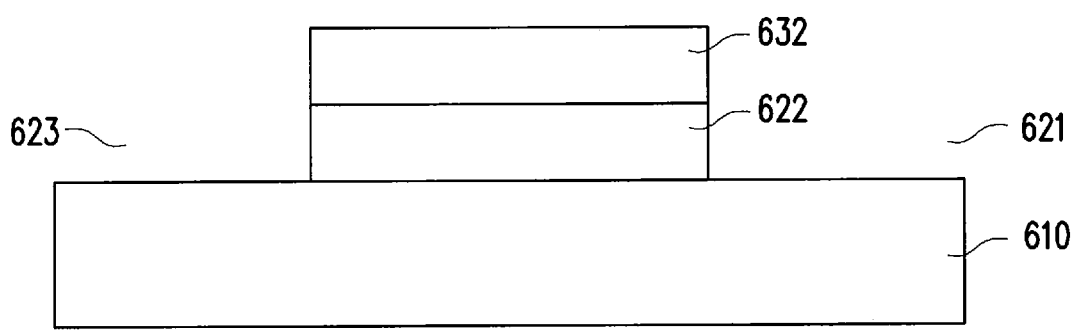

FIG. 6D is a cross-sectional view of the grating coupler 600 including a middle portion 622 of the silicon layer 620, which is formed at one of the various stages of fabrication, according to some embodiments of the present disclosure. Because the masking layer 630 was patterned to have openings over the left and right portions 623, 621 of the silicon layer 620, the left and right portions 623, 621 that are left exposed by the masking layer are removed, e.g., via a wet or dry etch procedure.

Figure 6E:
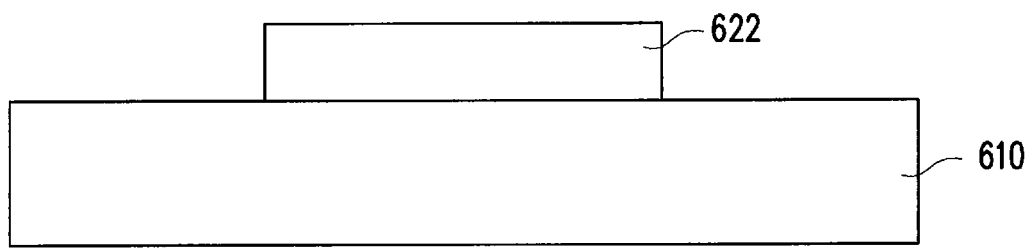

FIG. 6E is a cross-sectional view of the grating coupler 600, where the masking layer 632 is removed at one of the various stages of fabrication, according to some embodiments of the present disclosure. For example, the masking layer 632 may be removed by a resist stripping.

Figure 6F:
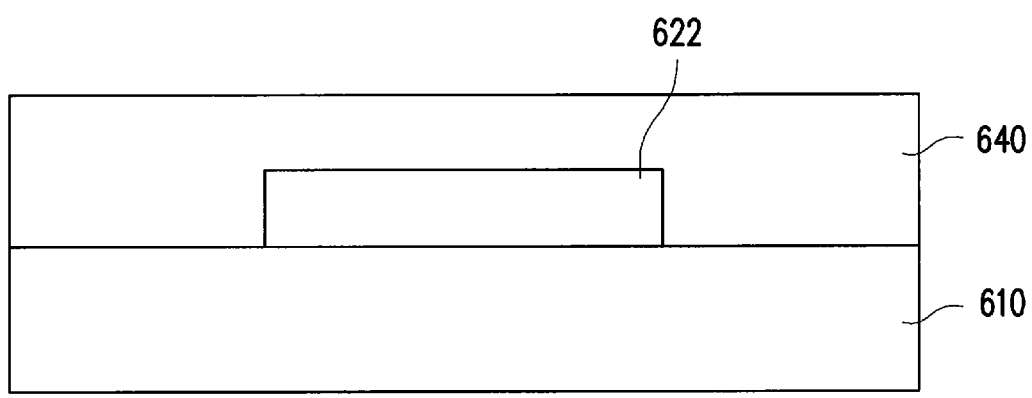

FIG. 6F is a cross-sectional view of the grating coupler 600 including another masking layer 640, which is formed on the remaining silicone layer 622 at one of the various stages of fabrication, according to some embodiments of the present disclosure. The coated masking layer 640 on the silicone layer 622 may comprise a photoresist (PR) material. As shown in FIG. 6F, the coated masking layer 640 covers not only the silicone layer 622, but also the left and right portions of the first layer 610.

Figure 6G:
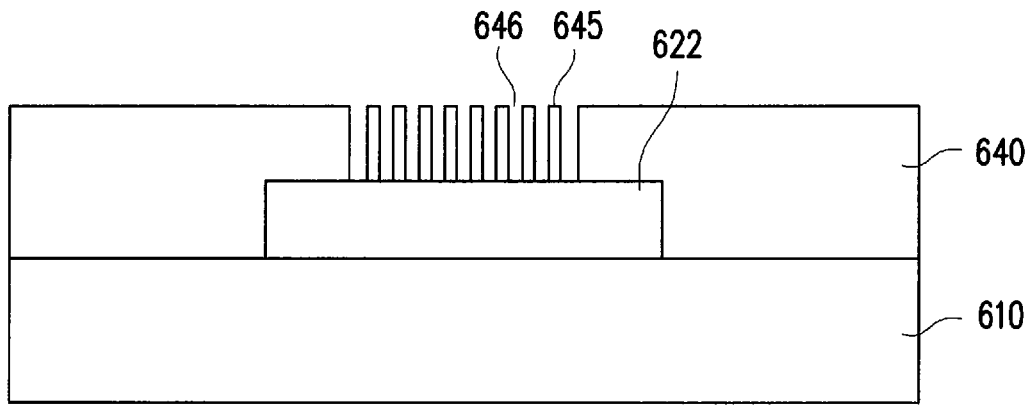

FIG. 6G is a cross-sectional view of the grating coupler 600 including a plurality of trenches 646, which is formed on the silicon layer 622 at one of the various stages of fabrication, according to some embodiments of the present disclosure. Based on waveguide lithography and development, the masking layer 640 is patterned to include a plurality of stacks 645 formed on the silicon layer 622, e.g. by etching the masking layer 640 to form a plurality of trenches 646 between the plurality of stacks 645.

Figure 6H:
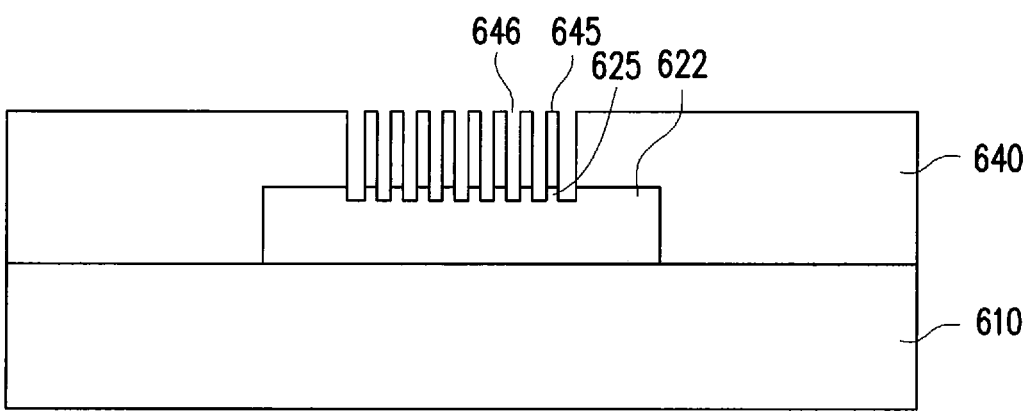

FIG. 6H is a cross-sectional view of the grating coupler 600 including a plurality of gratings 625, which is formed at one of the various stages of fabrication, according to some embodiments of the present disclosure. Because the masking layer 640 was patterned to have openings 646 over the silicon layer 622, the exposed portions of the silicon layer 622 are removed, e.g., via a wet or dry etch procedure, to form the plurality of gratings 625.

Figure 6I:
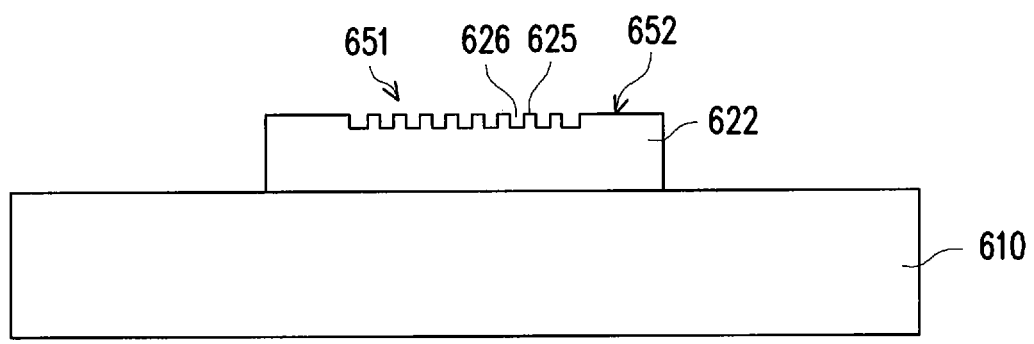

FIG. 6I is a cross-sectional view of the grating coupler 600, where the masking layer 640 is removed at one of the various stages of fabrication, according to some embodiments of the present disclosure. For example, the masking layer 640 may be removed by a resist stripping. In the embodiment shown in FIG. 6I, the silicon layer 622 includes a grating portion 651 and a waveguide portion 652 coupled to the grating portion 651. The grating portion 651 includes a plurality of coupling gratings 625 separated by shallow trenches 626. The shallow trenches 626 may be formed by a single-step etching process.

Figure 6J:
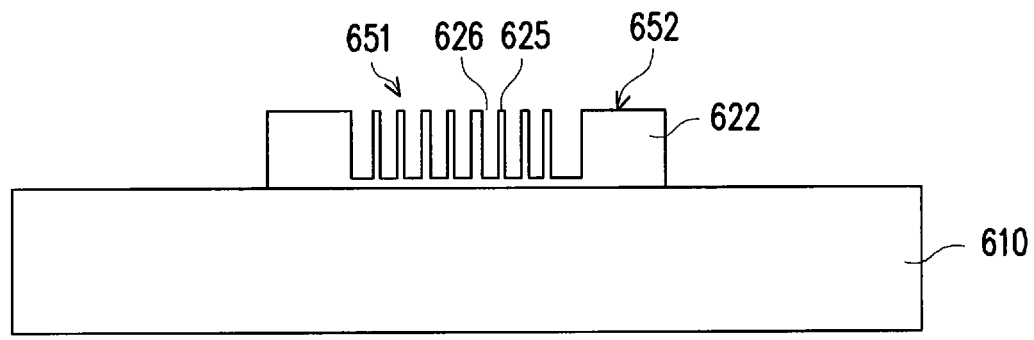

FIG. 6J is a cross-sectional view of the grating coupler 600, where the masking layer 640 is removed at one of the various stages of fabrication, according to some embodiments of the present disclosure. In the embodiment shown in FIG. 6J, the silicon layer 622 includes a grating portion 651 and a waveguide portion 652 coupled to the grating portion 651. The grating portion 651 includes a plurality of coupling gratings 625 separated by deep trenches 626. The deep trenches 626 may be formed by a multi-step etching process. For example, with the patterned masking layer 640 over the silicon layer 622 shown in FIG. 6H, at least two or three steps of etching may be performed on the exposed portions of the silicon layer 622 to form the plurality of high gratings 625 shown in FIG. 6J.

Figure 7:
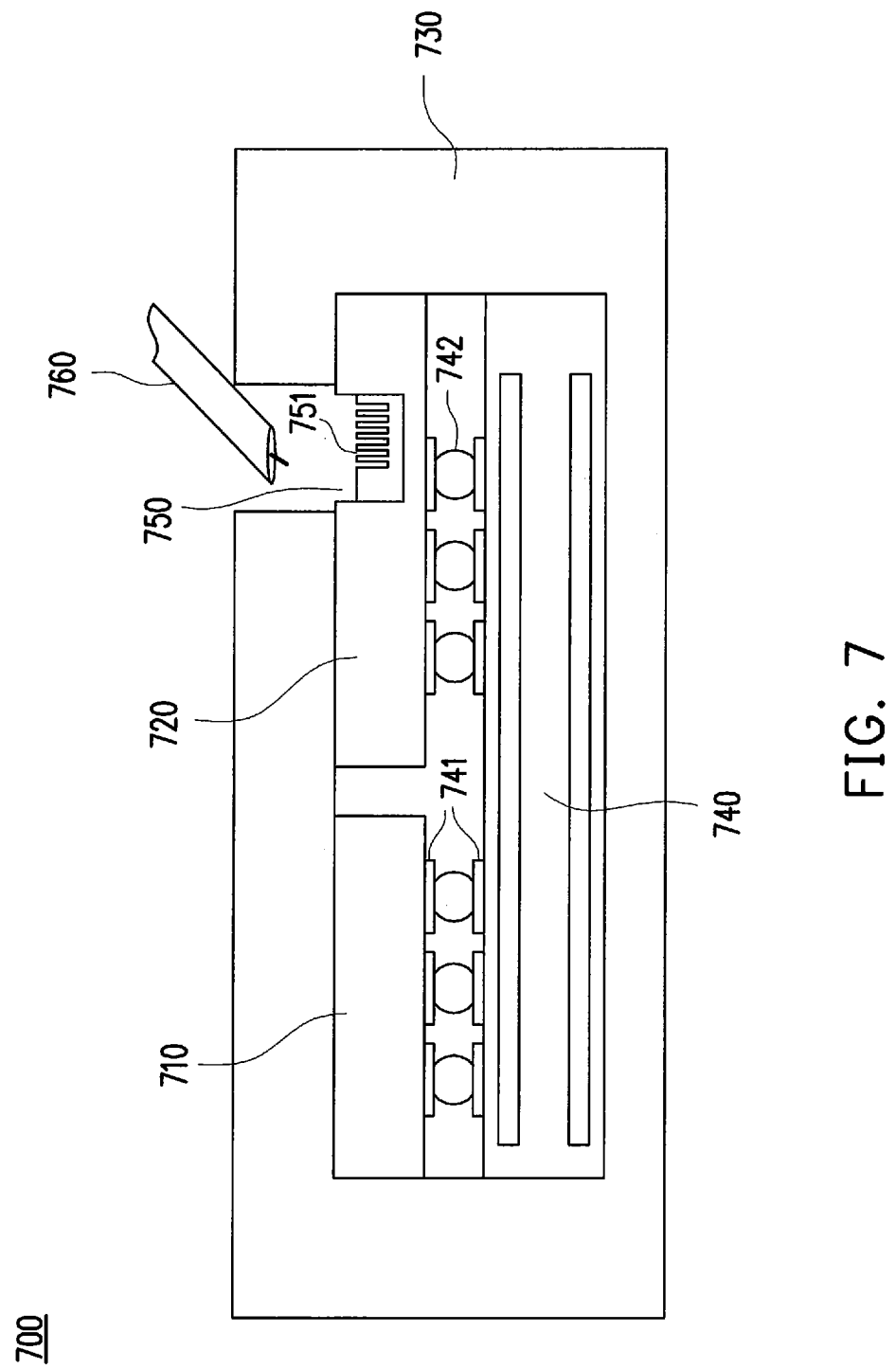
FIG. 7 illustrates a cross-sectional view of an exemplary optical device, in accordance with some embodiments of the present disclosure.

FIG. 7 illustrates a cross-sectional view of an exemplary optical device 700, in accordance with some embodiments of the present disclosure. As shown in FIG. 7, the optical device 700 includes an electronic die 710 and a photonic die 720 that are connected via an interposer 740, through bumps 742 and pads 741. The electronic die 710, the photonic die 720 and the interposer 740 are covered by package material 730 which has an opening on top of a trench 750 of the photonic die 720. The optical device 700 further includes a grating coupler 751 located in the trench 750 for transmitting optical signals between the semiconductor photonic die 720 and an optical fiber array 760. The grating coupler 751 here serves as an optical input/output (I/O) device for the optical device 700.

According to some embodiments, the grating coupler 751 is configured for receiving optical signals from the optical fiber array 760 at an angle that is measured between an axis of the optical fiber array 760 and a direction perpendicular to a surface of the grating coupler 751. According to various embodiments, a height of the optical fiber array 760 compared to the grating coupler 751 is adjustable between 0 and 100 micrometers; and the angle of the optical fiber array 760 is adjustable between 0 and 20 degrees. The fiber angle may be modified to improve coupler efficiency of the grating coupler 751.

Figure 8:
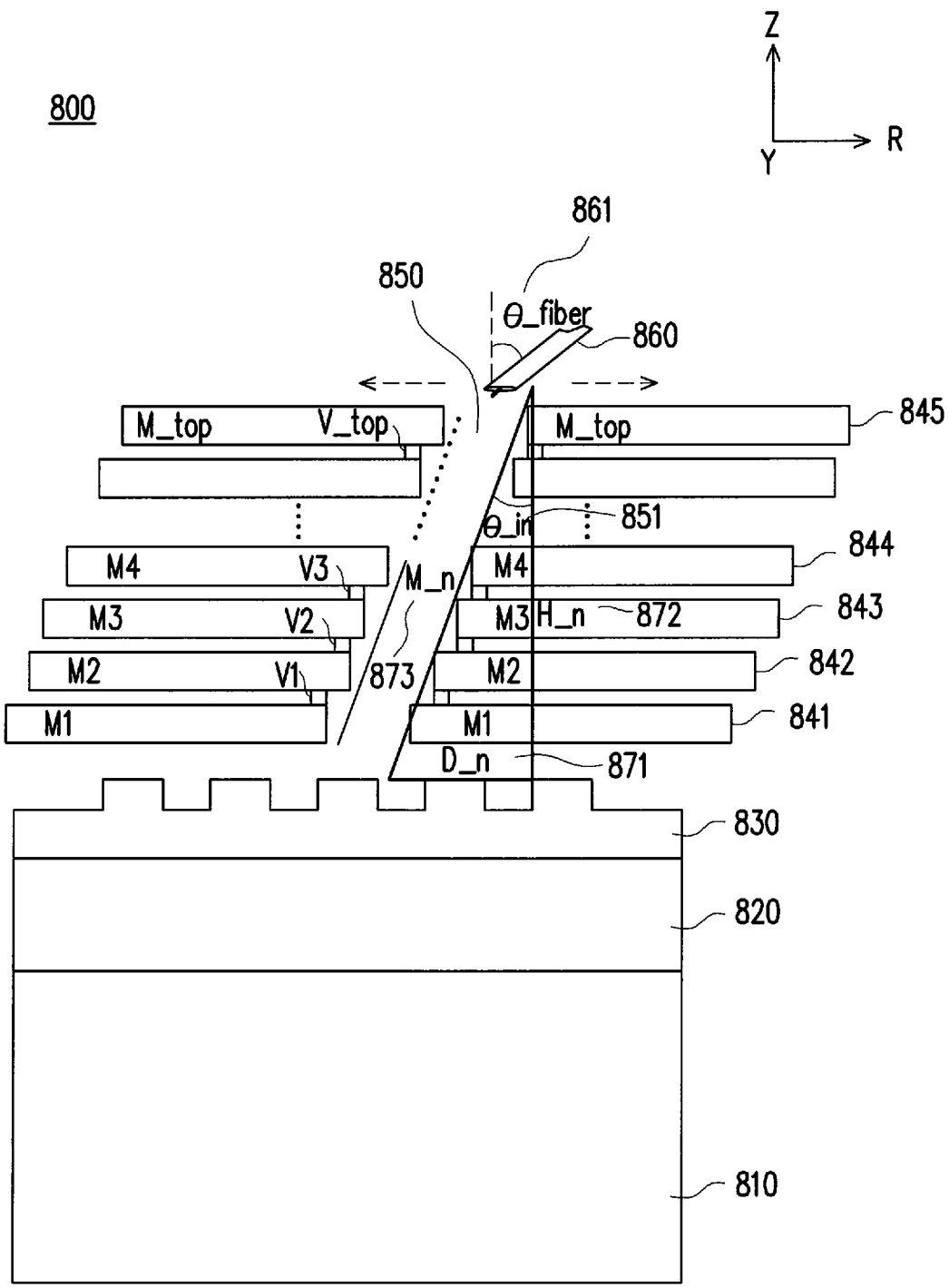
FIG. 8 illustrates a cross-sectional view of an exemplary optical die with tilted metal layer openings, in accordance with some embodiments of the present disclosure.

FIG. 8 illustrates a cross-sectional view of an exemplary optical die 800 with tilted metal layer openings, in accordance with some embodiments of the present disclosure. As shown in FIG. 8, the optical die 800 includes a substrate 810, a silicon oxide layer 820 disposed on the substrate 810, and a grating coupler 830 disposed on the silicon oxide layer 820. The grating coupler 830 on the optical die 800 is configured for transmitting optical signals between the optical die 800 and an optical fiber array 860. The optical fiber array 860 may be bonded to the semiconductor photonic die 800 by a transparent epoxy adhesive.

As shown in FIG. 8, the optical die 800 further comprises a plurality of metal layers M1 841, M2 842 . . . M_top 845 over the grating coupler 830. Each of the plurality of metal layers has an opening above the grating coupler 830, such that the openings of the plurality of metal layers form a channel 850 extending along a first direction for conveying optical signals between an optical fiber array 860 and the grating coupler 830. A non-zero angle $\theta\_in$ 851 is formed between the first direction and a second direction (the Z direction in FIG. 8) that is perpendicular to a surface of the substrate 810. According to some embodiments, the angle $\theta\_in$ 851 is between 5 and 20 degrees. In one embodiment, the channel 850 comprises an empty space for conveying the optical signals. In another embodiment, the channel 850 comprises dielectric material, e.g. oxide material, to form a small waveguide for guiding the optical signals along the tilted angle $\theta\_in$ 851.

During fabrication of the channel 850, the angle $\theta\_in$ 851 can be determined based on at least two of: a total height H_n 872 of the plurality of metal layers M1 841, M2 842 . . . M_top 845 along the Z direction, a grating position D_n 871 along the R direction, and a channel length M_n 873. The grating position D_n 871 is a shifting distance between the opening of the lowest metal layer M1 841 and the opening of the top metal layer M_top 845, along the lateral R direction. For example, a cosine value of the angle $\theta\_in$ 851 can be calculated based on a ratio between the height H_n 872 and the channel length M_n 873, such that the angle $\theta\_in$ 851 can be determined based on the cosine value. In another example, a tangent value of the angle $\theta\_in$ 851 can be calculated based on a ratio between the grating position D_n 871 and the height H_n 872, such that the angle $\theta\_in$ 851 can be determined based on the tangent value.

On the other hand, once a desired angle $\theta\_in$ 851 is determined, each of the grating position D_n 871, the height H_n 872, and the channel length M_n 873 can be determined given any one of the three. For example, based on a given height H_n 872, the grating position D_n 871 can be determined based on a tangent value of the angle $\theta\_in$ 851, and the channel length M_n 873 can be determined based on a cosine value of the angle $\theta\_in$ 851.

The optical fiber array 860 also has a fiber angle $\theta\_fiber$ 861 measured between an axis of the optical fiber array 860 and the Z direction that is perpendicular to the surface of the substrate 810. Once the channel 850 is formed with a desired angle θ_in 851 for a good grating couple efficiency, the optical signals going through the channel 850 will follow the desired angle θ_in 851, regardless of the fiber angle θ_fiber 861 and even if the optical fiber array 860 is not exactly aligning with the opening of the top metal layer M_top 845 along the Y direction and/or the R direction. In one embodiment, the desired angle θ_in 851 is kept when forming each metal layer above the first metal layer M1 841. For example, a position of the opening at the second metal layer M2 842 is determined based on the position of the opening at the first metal layer M1 841, the distance between the two metal layers M1 841 and M2 842, and the desired angle θ_in 851. When there is a dielectric layer between every two adjacent metal layers, the dielectric layer may also be patterned to keep the desired angle θ_in 851 while the dielectric layer is formed. In another embodiment, the dielectric layer is not patterned and dielectric material is filled into the opening at each metal layer to form a dielectric channel 850. This dielectric channel 850, bounded by metal material of the metal layer and the vias V1, V2 . . . V_top, forms a waveguide with the desired angle θ_in 851 for guiding the optical signals going through the dielectric channel 850.

As such, once the channel 850 is formed with a desired angle θ_in 851 according to an operational wavelength, the optical die 800 may be used with various optical fiber arrays having various fiber angles, which can reduce the cost and complexity of the semiconductor device. In one example, the channel 850 is formed with a desired angle θ_in 851 equal to 12 degrees according to an operational wavelength, and the fiber angle θ_fiber 861 may be adjustable between 0 and 20 degrees.

As shown in FIG. 8, vias V1, V2 . . . V_top are used to connect the plurality of metal layers M1 841, M2 842 . . . M_top 845. In some embodiments, the metal layers and the vias can comprise materials like copper, aluminum, silver, silicon, etc. to reduce the optical loss during optical I/O coupling.

In one embodiment, an apparatus for optical coupling is disclosed. The apparatus includes: a substrate; a grating coupler comprising a plurality of coupling gratings over the substrate, wherein each of the plurality of coupling gratings extends in a first lateral direction and has a cross-section having a middle-raised shape in a second lateral direction, wherein the first and second lateral directions are parallel to a surface of the substrate and perpendicular to each other in a grating plane; and a cladding layer comprising an optical medium, wherein the cladding layer is filled in over the grating coupler.

In another embodiment, an apparatus for optical coupling is disclosed. The apparatus includes: a semiconductor photonic die and a plurality of coupling gratings. Each of the plurality of coupling gratings extends in a first lateral direction and has a cross-section having at least two layers in a second lateral direction. The at least two layers comprise a first layer on the semiconductor photonic die and a second layer on a middle portion of the first layer. The second layers of the plurality of coupling gratings have duty cycles changing along the second lateral direction.

In yet another embodiment, a system for communication is disclosed. The system includes: a semiconductor photonic die on a substrate, wherein the semiconductor photonic die comprises at least one trench and a plurality of metal layers over the at least one trench; an optical fiber array attached to the semiconductor photonic die; and at least one grating coupler in the at least one trench on the semiconductor photonic die for transmitting optical signals between the semiconductor photonic die and the optical fiber array. Each of the plurality of metal layers has an opening above the at least one grating coupler. The openings of the plurality of metal layers form a channel extending along a first direction for conveying optical signals between the optical fiber array and the at least one grating coupler. A non-zero angle is formed between the first direction and a second direction that is perpendicular to a surface of the substrate.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An apparatus for optical coupling, comprising:
a substrate;
a grating coupler comprising a plurality of coupling gratings over the substrate, wherein each of the plurality of coupling gratings extends in a first lateral direction and has a cross-section having a middle-raised shape in a second lateral direction, wherein the first and second lateral directions are parallel to a surface of the substrate and perpendicular to each other in a grating plane, the grating coupler is configured for receiving optical signals from an optical fiber array at a non-zero angle, and the non-zero angle is measured between an axis of the optical fiber array and a direction perpendicular to the grating plane; and
a cladding layer comprising an optical medium, wherein the cladding layer is filled in over the grating coupler.

2. The apparatus of claim 1, wherein:
the middle-raised shape is symmetric about a direction perpendicular to the grating plane.

3. The apparatus of claim 1, wherein:
the middle-raised shape comprises at least three layers.

4. The apparatus of claim 1, wherein:
the non-zero angle is between 0 and about 15 degrees.

5. The apparatus of claim 1, wherein:
the grating coupler comprises silicon and silicon oxide; and
the silicon in the grating coupler has a thickness between about 250 and about 350 nanometers.

6. The apparatus of claim 1, wherein each of the plurality of coupling gratings has a cross-section comprising a first layer disposed on the substrate and a second layer on a middle portion of the first layer, wherein the second layers of the plurality of coupling gratings have duty cycles changing along the second lateral direction.

7. The apparatus of claim 6, wherein the second layers of the plurality of coupling gratings have duty cycles increasing along the second lateral direction.

8. The apparatus of claim 6, wherein the second layers of the plurality of coupling gratings have duty cycles decreasing along the second lateral direction.

9. The apparatus of claim 6, wherein the second layers of the plurality of coupling gratings have duty cycles that first increases and then decreases along the second lateral direction.

10. The apparatus of claim 6, wherein the second layers of the plurality of coupling gratings have duty cycles that first decreases and then increases along the second lateral direction.

11. The apparatus of claim 6, wherein the second layers of the plurality of coupling gratings have duty cycles between about 20% and about 50%.

12. The apparatus of claim 6, wherein the first layers of the plurality of coupling gratings have duty cycles changing along the second lateral direction.

13. An apparatus for optical coupling, comprising:
a substrate;
a grating coupler comprising a plurality of coupling gratings over the substrate, wherein each of the plurality of coupling gratings extends in a first lateral direction and has a cross-section having a middle-raised shape in a second lateral direction, wherein the first and second lateral directions are parallel to a surface of the substrate and perpendicular to each other in a grating plane, and wherein the grating coupler comprises silicon and silicon oxide, and the silicon in the grating coupler has a thickness between about 250 and about 350 nanometers; and
a cladding layer comprising an optical medium, wherein the cladding layer is filled in over the grating coupler.

14. The apparatus of claim 13, wherein the middle-raised shape is symmetric about a direction perpendicular to the grating plane.

15. The apparatus of claim 13, wherein the middle-raised shape comprises at least three layers.

16. The apparatus of claim 13, wherein the grating coupler is configured for receiving optical signals from an optical fiber array at a non-zero angle, wherein the non-zero angle is measured between an axis of the optical fiber array and a direction perpendicular to the grating plane.

17. The apparatus of claim 16, wherein the non-zero angle is between 0 and about 15 degrees.

18. An apparatus for optical coupling, comprising:
a substrate;
a grating coupler comprising a plurality of coupling gratings over the substrate, wherein each of the plurality of coupling gratings extends in a first lateral direction and has a cross-section in a second lateral direction, wherein the first and second lateral directions are parallel to a surface of the substrate and perpendicular to each other in a grating plane, the grating coupler is configured for receiving optical signals from an optical fiber array at a non-zero angle, and the non-zero angle is measured between an axis of the optical fiber array and a direction perpendicular to the grating plane,
wherein each of the plurality of coupling gratings has a cross-section comprising a first layer disposed on the substrate and a second layer on a middle portion of the first layer,
wherein each of the first and second layers of the plurality of coupling gratings have duty cycles changing along the second lateral direction; and
a cladding layer comprising an optical medium, wherein the cladding layer is filled in over the grating coupler.

19. The apparatus of claim 18, wherein:
the grating coupler comprises silicon and silicon oxide; and
the silicon in the grating coupler has a thickness between about 250 and about 350 nanometers.

20. The apparatus of claim 18, wherein the second layers of the plurality of coupling gratings have duty cycles between about 20% and about 50%.

* * * * *